United States Patent
Zhao et al.

(10) Patent No.: US 11,124,914 B2
(45) Date of Patent: Sep. 21, 2021

(54) SUPPORT LEVELING DEVICE FOR A HOUSEHOLD APPLIANCE, AND A HOUSEHOLD APPLIANCE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Peishi Lv, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 0 days.

(21) Appl. No.: 16/642,622

(22) PCT Filed: Aug. 31, 2018

(86) PCT No.: PCT/CN2018/103455
§ 371 (c)(1),
(2) Date: Feb. 27, 2020

(87) PCT Pub. No.: WO2019/042393
PCT Pub. Date: Mar. 7, 2019

(65) Prior Publication Data
US 2020/0347540 A1 Nov. 5, 2020

(30) Foreign Application Priority Data
Sep. 1, 2017 (CN) .......................... 201710781146.8

(51) Int. Cl.
*F16M 7/00* (2006.01)
*D06F 39/12* (2006.01)
(Continued)

(52) U.S. Cl.
CPC ............ *D06F 39/125* (2013.01); *D06F 37/20* (2013.01); *F16M 5/00* (2013.01); *F16M 7/00* (2013.01);
(Continued)

(58) Field of Classification Search
CPC combination set(s) only.
See application file for complete search history.

(56) References Cited

U.S. PATENT DOCUMENTS 4,625,424 A * 12/1986 de la Haye .............. G12B 5/00
248/649
4,949,923 A * 8/1990 Daily ....................... F16M 7/00
248/188.3
(Continued)

FOREIGN PATENT DOCUMENTS

CH 695348 A5 4/2006
CN 105757408 A 7/2016
(Continued)

OTHER PUBLICATIONS

Proquest Full Translation of CN105757408 cited in IDS filed Feb. 27, 2020. (Year: 2016).*
(Continued)

*Primary Examiner* — Monica E Millner
(74) *Attorney, Agent, or Firm* — Buchanan Ingersoll & Rooney PC (57) ABSTRACT

A support leveling device includes leveling feet mounted on a bottom plate of an appliance. Each leveling foot comprises a sheath, having a hollow cavity with an opening, and mounted on the plate; a regulating foot, the plate having a through hole corresponding to the opening of the hollow cavity, one end of the regulating foot passing through the through hole and extending into the hollow cavity of the sheath for axial movement relative thereto, and another end
(Continued)

of the regulating foot located at an outer side of the bottom plate and supported on a support surface; and a hydraulic medium sealed in a cavity defined by the regulating foot and the sheath. When the leveling foot is placed on an uneven support surface, the regulating feet are stressed to axially move along the sheath, and the hydraulic medium is stressed to act on the regulating foot for support leveling.

9 Claims, 4 Drawing Sheets

(51) Int. Cl.
  *D06F 37/20* (2006.01)
  *F16M 5/00* (2006.01)
(52) U.S. Cl.
  CPC ... *F16M 2200/044* (2013.01); *F16M 2200/08* (2013.01)

(56) References Cited

U.S. PATENT DOCUMENTS

| | | | | |
|---|---|---|---|---|
| 4,967,994 | A * | 11/1990 | Rice | D06F 39/001 248/649 |
| 6,009,815 | A * | 1/2000 | Hartman | A47B 91/02 108/147 |
| 7,597,294 | B2 * | 10/2009 | Lotz | D06F 39/125 248/188.3 |
| 8,104,724 | B2 * | 1/2012 | Sorohan | A47B 91/16 248/188.3 |
| 8,118,379 | B2 * | 2/2012 | Hong | D06F 39/125 312/351.3 |
| 2006/0180720 | A1 * | 8/2006 | Cournoyer | A47B 91/02 248/188.2 |
| 2008/0190696 | A1 * | 8/2008 | Pike | A47B 91/16 182/202 |
| 2010/0224742 | A1 * | 9/2010 | Sorohan | A47B 91/16 248/157 |
| 2010/0237205 | A1 * | 9/2010 | Hirsh | A47C 7/008 248/188.4 |
| 2013/0313385 | A1 * | 11/2013 | Mora | F16M 7/00 248/188.4 |
| 2018/0187362 | A1 | 7/2018 | Zhao et al. | |

FOREIGN PATENT DOCUMENTS

| | | |
|---|---|---|
| CN | 205636216 U | 10/2016 |
| CN | 205640067 U | 10/2016 |

OTHER PUBLICATIONS

International Search Report (PCT/ISA/210) dated Nov. 23, 2018, by the Chinese Patent Office as the International Searching Authority for International Application No. PCT/CN2018/103455.
Written Opinion (PCT/ISA/237) dated Nov. 23, 2018, by the Chinese Patent Office as the International Searching Authority for International Application No. PCT/CN2018/103455.
Extended Search Report issued by the European Patent Office in corresponding European Patent Application No. 18852346.8-1009 dated Sep. 23, 2020 (6 pages).

* cited by examiner

SUPPORT LEVELING DEVICE FOR A HOUSEHOLD APPLIANCE, AND A HOUSEHOLD APPLIANCE

TECHNICAL FIELD

The present disclosure relates to the technical field of support leveling of a household appliance, in particular to a household appliance support and a household appliance.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt feet mounted at the bottom of its casing or the whole machine. Each bolt foot comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt feet into different lengths of the screw holes of the base plate. Mostly, the height of the washing machine is increased if the feet of the washing machine rotate counterclockwise, and the height of the washing machine is reduced if the feet of the washing machine rotate clockwise. After the height adjustment of the bolt feet is completed, the nut washers for preventing loosening are tightened to keep the washing machine stable.

Although said bolt feet of the washing machine implement the leveling of the washing machine, a user still needs to carry out manual adjustment. If the washing machine has a relatively large self-weight or a placement space for the washing machine is narrow, it is very inconvenient to operate for user. Additionally, vibration of the washing machine in a long-term working process also act on the leveling feet and causes support failure of the feet, resulting in unlevel placement of the washing machine.

For example, an existing 80 KG drum washing machine generally has a weight of about 80 KG which is relatively heavy, so its height adjustment is very inconvenient for users. Even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a failure of support problem, which greatly influences use comfortableness of the user.

In addition, the vibration of the unlevel washing machine may cause loosening of foot screws, which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

In order to solve the above problems, the first object of the present disclosure is to provide a support leveling device for a household appliance. Specifically, the following technical solutions are adopted:

A support leveling device for a household appliance, comprising a leveling foot mounted on a bottom plate of the household appliance, wherein the leveling foot comprises:

a sheath, being internally provided with a hollow cavity with an opening, the opening is mounted on the bottom plate;

a regulating foot, the bottom plate being provided with a through hole corresponding to the opening of the hollow cavity, one end of the regulating foot passes through a through hole and extends into the hollow cavity of the sheath, so that the regulating foot is axially moving relative to the hollow cavity of the sheath, and another end of the regulating foot is located at an outer side of the bottom plate and is supported on a support surface; and a hydraulic medium is accommodated in a cavity defined by the regulating foot and the sheath;

when the leveling foot is placed on the uneven support surface, the regulating foot are stressed to axially move along the sheath, and the hydraulic medium is stressed to act on the regulating foot for support leveling.

Further, the leveling foot comprises a flexible accommodation body, the flexible accommodation body is arranged in the cavity defined by the regulating foot and the sheath and is in contact with the end, located in the hollow cavity of the sheath, of the regulating foot;

the flexible accommodation body is internally provided with an accommodation cavity, the flexible accommodation body is provided with an open portion communicating with the accommodation cavity, the open portion is mounted in the sheath in a seal manner, and the hydraulic medium is accommodated in the accommodation cavity of the flexible accommodation body; and when the leveling foot is placed on the uneven support surface, the regulating foot are stressed to axially move along the sheath to squeeze the flexible accommodation body, and the hydraulic medium is stressed to act on the regulating foot for support leveling.

Further, the leveling foot comprises a hydraulic plate, wherein the hydraulic plate is arranged in the hollow cavity of the sheath;

the hydraulic plate is internally provided with a throttling flow channel, the hydraulic plate is provided with a hydraulic nozzle communicating with the throttling flow channel, and the open portion of the flexible accommodation body is mounted on the hydraulic plate in a seal manner and is communicated with the throttling flow channel, and the hydraulic nozzles of two leveling feet communicate with each other through a hydraulic pipe, the hydraulic medium circulates between the leveling feet.

Further, a side wall of the sheath is provided with an avoiding port penetrating from the opening of the sheath to a closed end of the sheath, the avoiding port is configured to avoid the hydraulic nozzle when the hydraulic plate is mounted in the hollow cavity of the sheath, and the hydraulic nozzle of the hydraulic plate protrudes out of the sheath through the avoiding port.

Further, a closed end of the hollow cavity of the sheath is internally provided with a throttling flow channel, the closed end of the hollow cavity is provided with a hydraulic nozzle communicating with the throttling flow channel, the open portion of the flexible accommodation body is mounted on an inner wall of the closed end of the hollow cavity of the sheath in a seal manner and is communicated with the throttling flow channel, and the hydraulic nozzles of two leveling feet communicate with each other through a hydraulic pipe, the hydraulic medium circulate between the leveling feet.

Further, the regulating foot comprises a slider portion and a support portion, the slider portion is arranged in the hollow cavity of the sheath and is axially slidable, one end of the support portion passes through the through hole and extends into the hollow cavity of the sheath and is fixedly connected with the slider portion, and another end of the support portion extends to the outer side of the bottom plate and is supported on the support surface.

Further, the support portion comprises a connecting rod and a support base, one end of the connecting rod passes through the through hole and extends into the hollow cavity of the sheath and is fixedly connected with the slider portion, another end of the connecting rod extends to the outer side of the bottom plate and is fixedly connected with the support base, and the support base is supported on the support surface.

Further, a friction damping device is arranged on a bottom surface, which is contact with the support surface, of the support portion;

preferably, a friction damping device is arranged on a bottom surface of the support base.

Further, the sheath is arranged on an inner side of the bottom plate, and is internally provided with the hollow cavity of the opening, and the opening is fixedly mounted on the inner side of the bottom plate;

preferably, the opening of the hollow cavity of the sheath is turned outward to form a connection flanging, and a fixing hole is arranged on the connection flanging, and a mounting hole is correspondingly arranged on the bottom plate; the connection flanging is fit to a surface of the inner side of the bottom plate, and a connector passes through the fixing hole and the mounting hole to fix and connect the sheath to the inner side of the base plate.

The second object of the present disclosure is to provide a household appliance provided with the support leveling device for the household appliance according to any one of the above.

According to the support leveling device for the household appliance of the present disclosure, the hydraulic principle is adopted by the leveling foot, due to different stresses caused by unevenness, the foot automatically adjust adaptively through the fluidity of the hydraulic medium until the foot for the household appliance reach balance, the hydraulic medium stop circulating, and automatic leveling is achieved.

According to the support leveling device for the household appliance of the present disclosure, the sheaths are mounted on the inner side of the bottom plate of the household appliance, through the mounting method of mounting the support leveling device for the household appliance of the present disclosure on the bottom plate of the household appliance, except for the regulating foot located on the outer side of the bottom plate, other components are located on the inner side of the bottom plate, and the arranging mode of the regulating foot is the same as that of feet of an existing washing machine.

Therefore, through the support leveling device for the household appliance of the present disclosure, the overall height of the washing machine is not increased, automatic leveling in a wider range is achieved, and the support stability for the household appliance is better.

DETAILED DESCRIPTION

The support leveling device for the household appliance and the household appliance of the present disclosure are described in detail below in combination with accompanying drawings:

Embodiment 1

As shown in FIGS. 1 to 4, a support leveling device for a household appliance provided by the embodiment comprises a leveling foot mounted on a bottom plate 700 of the household appliance, wherein the leveling foot comprises:

a sheath 300, the sheath being arranged on the inner side of the bottom plate 700 and internally provided with a hollow cavity with an opening, and the opening is fixedly mounted on the inner side of the bottom plate 700;

a regulating foot 500, the bottom plate 700 being provided with a through hole 702 corresponding to the opening of the hollow cavity, one end of the regulating foot 500 passing through the through hole 702 and extending into the hollow cavity of the sheath 300 and being capable of axially moving relative to the hollow cavity of the sheath, and another end of the regulating foot 500 being located at an outer side of the bottom plate 700 and supported on a support surface; and a hydraulic medium, the hydraulic medium being sealed in a cavity defined by the regulating foot 500 and the sheath 300;

when the leveling foot is placed on the uneven support surface, the regulating foot 500 are stressed to axially move along the sheath 300, and the hydraulic medium is stressed to act on the regulating foot 500 for support leveling.

The hydraulic principle is adopted by the leveling foot, due to different stresses caused by unevenness, the regulating foot 500 automatically adjust adaptively through the fluidity of the hydraulic medium until the household appliance reaches balance, the media stop circulating, and automatic leveling is achieved.

According to the support leveling device for the household appliance of the present disclosure, the sheath 300 is mounted on the inner side of the bottom plate 700 of the household appliance, through the mounting method of mounting the support leveling device for the household appliance of the present disclosure on the bottom plate 700 of the household appliance, except for the regulating foot 500 located on the outer side of the bottom plate 700, other components are located on the inner side of the bottom plate 700, and the arranging way of the regulating foot is the same as that of feet of an existing washing machine. Therefore, through the support leveling device for the household appliance of the present disclosure, the overall height of the washing machine is not increased, automatic leveling in a wider range is achieved, and the support stability for the household appliance is better.

In order to seal the hydraulic medium between the regulating foot 500 and the sheath 300, as an implementation mode of the embodiment, the leveling foot further comprises a flexible accommodation body 400, and the flexible accommodation body 400 is arranged in a cavity defined by the regulating foot 500 and the sheath 300, and makes contact with the end, located in the hollow cavity of the sheath 300, of the regulating foot 500;

the flexible accommodation body is internally provided with an accommodation cavity, the flexible accommodation body 400 is provided with an open portion 401 communicating with the accommodation cavity, the open portion 401 is hermetically mounted in the sheath 300, and the hydraulic medium is accommodated in the accommodation cavity of the flexible accommodation body 400;

when the leveling foot is placed on the uneven support surface, the regulating foot 500 are stressed to axially move along the sheaths 300 to squeeze the flexible accommodation body 400, and the hydraulic medium are stressed to act on the regulating foot 500 for support leveling.

In the embodiment, the hydraulic medium are accommodated in the flexible accommodation body 400, and then the flexible accommodation body 400 are hermetically mounted in the sheaths 300, so that the hydraulic medium are sealed, and the leveling effect of the leveling feet is determined by the leakproofness of the hydraulic medium.

In order to hermetically mount the flexible accommodation body 400 in the sheath, the leveling foot in the embodiment further comprises a hydraulic plate 100 which is arranged in the hollow cavity inside the sheath 300;

the hydraulic plate 100 is internally provided with a throttling flow channel 101, the hydraulic plate 100 is provided with a hydraulic nozzle 102 communicating with the throttling flow channel, the open portion 401 of the flexible accommodation body 400 is hermetically mounted on the hydraulic plate 100 and is communicated with the throttling flow channel 101, and the hydraulic nozzles 102 of two leveling feet communicate with each other through a hydraulic pipe, so that the hydraulic medium can circulate between the leveling feet.

In the embodiment, the flexible accommodation body 400 is directly hermetically mounted on the hydraulic plates 100, then an assembly of hydraulic plate-flexible accommodation body is hermetically mounted in the hollow cavity of the sheath 300, so that hermetical mounting of the flexible accommodation body 400 is achieved, and the assembly is simple and convenient.

The hydraulic plate 100 is provided with the throttling flow channel and the hydraulic nozzle, which can realize the communication between two or more leveling feet through a hydraulic pipe, when the stress is unbalanced, the hydraulic medium can circulate between the feet, and the whole leveling foot system is balanced, so that the better support leveling effect is achieved.

The hydraulic plates 100 in the embodiment may be located on the inner wall of the closed end of the hollow cavity of the sheath 300 or may be supported by the hydraulic medium to be located on the upper portion of the hollow cavity of the sheath 300.

In order to mount the assembly of hydraulic plate-flexible accommodation body into the hollow cavity of the sheath 300 and enable the hydraulic nozzle 102 to protrude out for convenient connection with hydraulic pipe, the side wall of the sheath 300 according to the embodiment is provided with an avoiding port penetrating from the opening to the closed end, the avoiding port are used for avoiding the hydraulic nozzle 102 when the hydraulic plate is mounted in the hollow cavity of the sheath, and the hydraulic nozzle 102 of the hydraulic plate 100 protrude out of the sheath through the avoiding port.

According to the leveling foot of the embodiment, the throttling flow channel 101 is formed in hydraulic connectors, so that rapid flow of the hydraulic medium is avoided, and thus the adjustment process is more stable. In addition, in the case where stress to the feet for the household appliance changes greatly, the throttling flow channel 101 can buffer well, and damage to the feet for the household appliance caused by sudden and rapid flow of the hydraulic medium is avoided.

Further, the hydraulic nozzle 102 is also provided with a barb structure, so that the hydraulic pipes subsequently connected and fastened are sealed without falling off.

Through the hydraulic plate 100 in the embodiment, separate hermetical assembly of the flexible accommodation body can be achieved, the assembled hydraulic plate-flexible accommodation body assembly is mounted in the hollow cavity of the sheath 300, and mounting is simpler. The hydraulic plates may not be adopted by the leveling feet of the embodiment for hermetical mounting of the flexible accommodation body 400, and the specific solution is as follows.

The closed end of the hollow cavity of the sheath 300 in the embodiment is internally provided with a throttling flow channel, the closed end of the hollow cavity is provided with the hydraulic nozzle communicating with the throttling flow channel, the open portion 401 of the flexible accommodation body 400 is hermetically mounted on the inner wall of the closed end of the hollow cavity of the sheath 300 and communicate with the throttling flow channel, and the hydraulic nozzle of two leveling feet communicate with each other through the hydraulic pipe, so that the hydraulic medium can circulate between the leveling feet.

In the embodiment, the flexible accommodation body 400 is directly hermetically mounted on the inner wall of the closed end of the hollow cavity of the sheath 300, that is, hermetical mounting of the flexible accommodation body 400 is achieved, and the overall structure is simplified. The sheath 300 is provided with the throttling flow channel and the hydraulic nozzle, communication between two or more leveling feet can be achieved through a hydraulic pipe or hydraulic pipes, when unbalanced stress is applied, the hydraulic medium can circulate between the feet, and the whole leveling foot system is balanced, so that the better support leveling effect is achieved.

Further, the leveling foot in the embodiment further comprises a pressure ring 200. The open portion of the flexible accommodation body 400 is fixed and sealed on the hydraulic plate 100 or the inner wall of the closed end of the hollow cavity of the sheath 300 through the pressure ring 200, the hydraulic plate 100 or the inner wall of the closed end of the hollow cavity of the sheath 300 is provided with a sealing groove 103, the pressure ring 200 is fixed to the hydraulic plate 100 or the inner wall of the closed end of the hollow cavity of the sheath 300 through a connector, and the open portion of the flexible accommodation body 400 is squeezed into the sealing groove 103, so that the open portion is kept in sealing contact with the sealing groove 103 for sealing.

The hydraulic medium in the embodiment may also be sealed in other ways. As an implementation mode of the embodiment, the leveling foot of the embodiment may not adopt flexible accommodation body or hydraulic plate, the regulating foot 500 can make sealing contact with the inner wall of the hollow cavity of the sheath 300 in the embodiment. Specifically, the seal ring may be arranged on the ends, located in the hollow cavity, of the regulating foot 500. Meanwhile, the sheath 300 is provided with the throttling flow channel and the hydraulic nozzle, and communication between two or more leveling feet can be achieved through a hydraulic pipe or hydraulic pipes.

Figure 1:
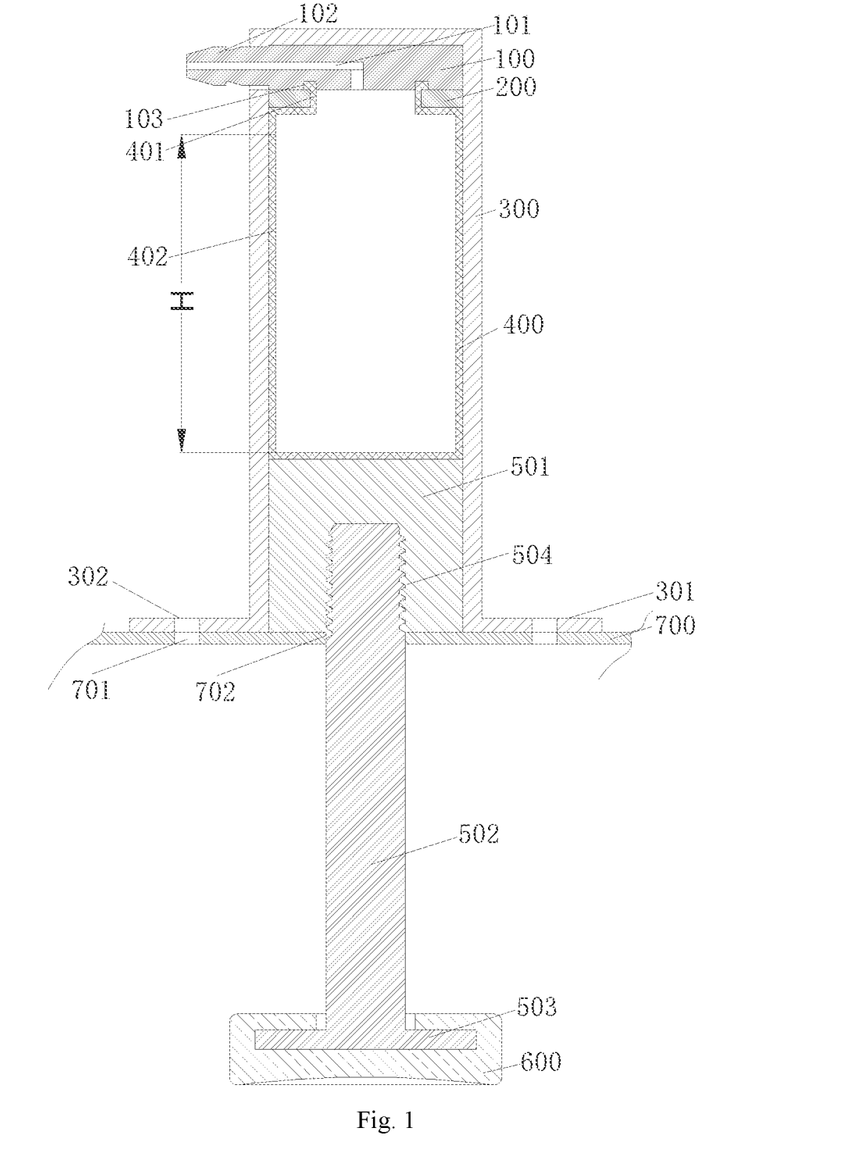
FIG. 1 is a sectional view of the leveling foot according to an embodiment of the present disclosure (in a state where the hydraulic medium is not under pressure)
Figure 2:
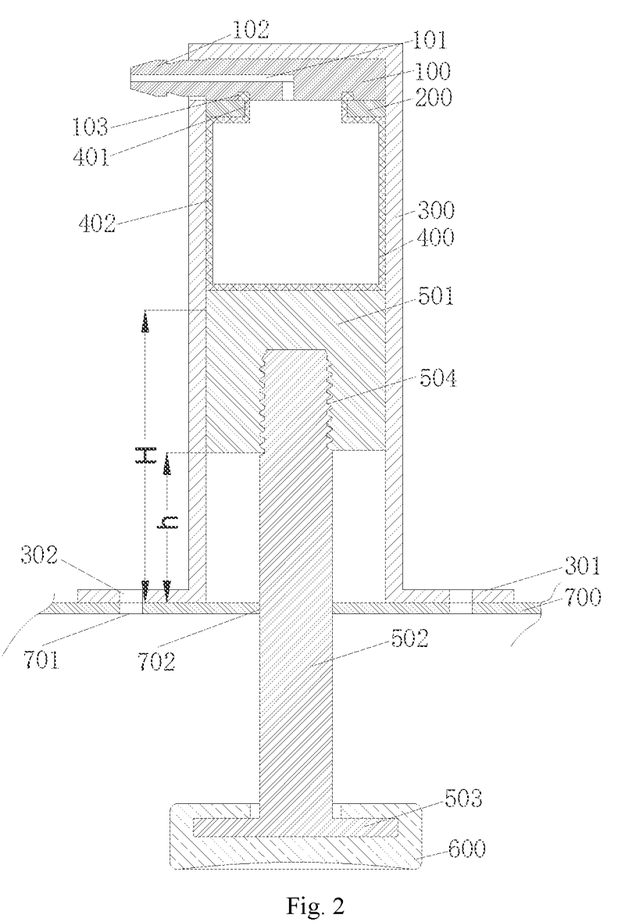
FIG. 2 is a sectional view of the leveling foot according to an embodiment of the present disclosure (in a state where the hydraulic medium is under pressure and partially squeezed out)
Figure 3:
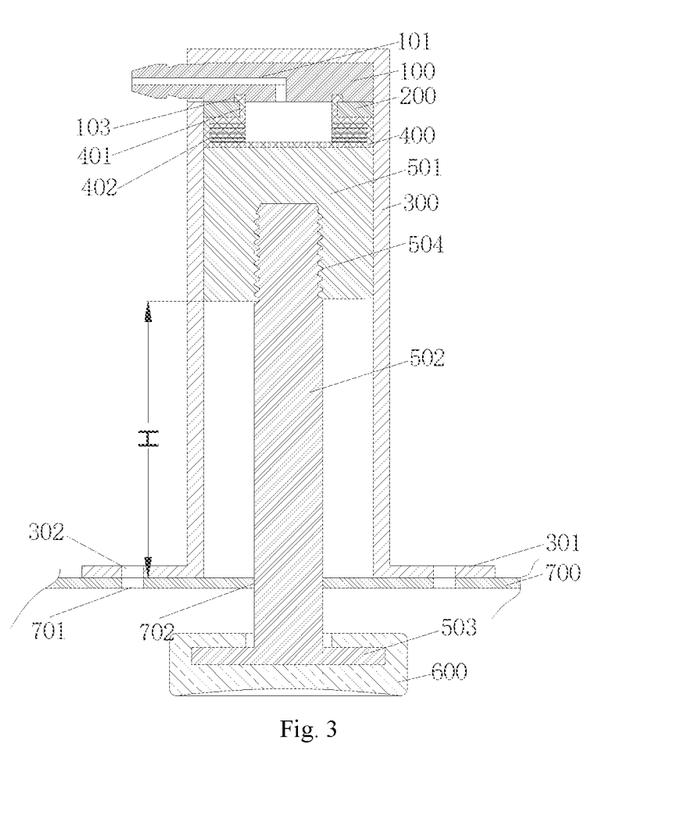
FIG. 3 is a sectional view of a leveling foot according to an embodiment of the present disclosure (in a state where the hydraulic medium is under pressure and completely squeezed out)

As shown in FIGS. 1 to 3, as an implementation mode of the embodiment, the regulating foot comprises a slider portion 501 and a support portion. the slider portion 501 is arranged in the hollow cavity of the sheath 300 and can slide axially, one end of the support portion passes through the through hole and extends into the hollow cavity of the sheath and is fixedly connected with the slider portion 501, and another end of the support portion extends to the outer side of the bottom plate 700 and is supported on the support surface.

Further, the support portion includes a connecting rod 502 and a support base 503. One end of the connecting rod 502 passes through the through hole and extends into the hollow cavity of the sheath 300 and is fixedly connected with the slider portion 501, and another end of the connecting rod 502 extends to the outer side of the bottom plate 700 and is fixedly connected with the support base 503. The support base 503 is supported on the support surface.

Preferably, the connecting rod 502 and the support base 503 are integrally formed. An end, connected with the slider portion 501, of the connecting rod 502 is provided with a connecting thread. The slider portion 501 is provided with a threaded hole. The connecting rod 502 is in threaded connection with the slider portion 501.

Figure 4:
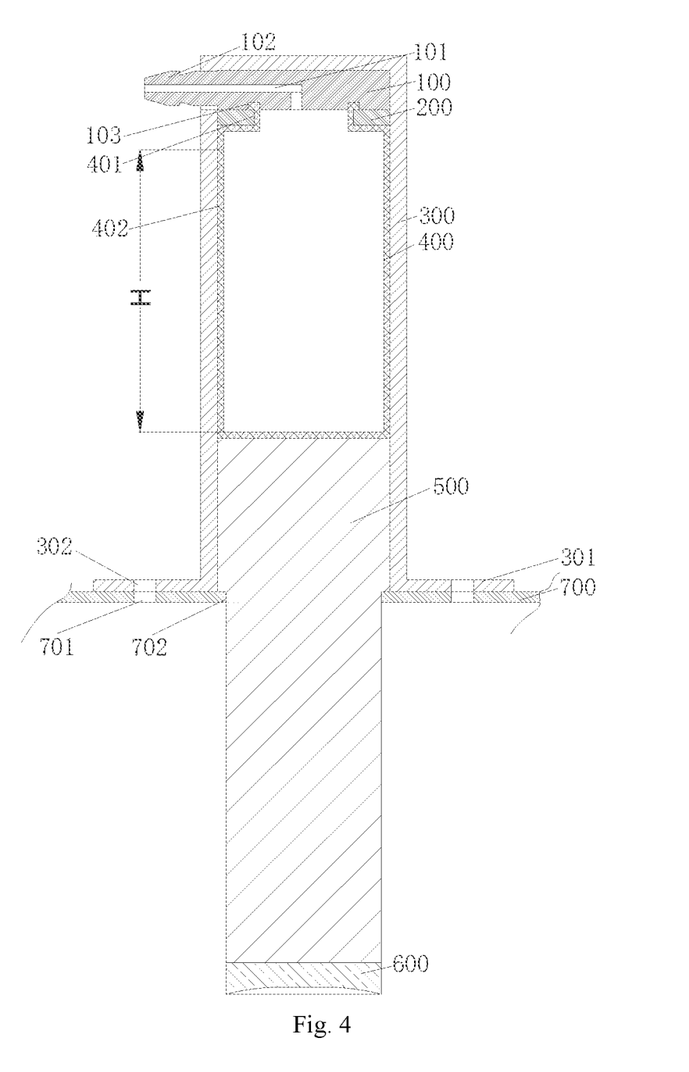
FIG. 4 is a sectional view of a leveling foot according to another embodiment of the present disclosure.

As shown in FIG. 4, as an implementation manner of this embodiment, each regulating foot 500 comprises a slider portion and a support portion which are integrally formed. The slider portion is arranged in the hollow cavity of the sheath 300 and can axially slide, and the support portion extends to the outer side of the bottom plate 700 and is supported on the support surface.

As an implementation manner of the embodiment, the opening of the hollow cavity of the sheath 300 is turned outward to form a connecting flanging 301, each connection flanging 301 is provided with a fixing hole 302, and the bottom plate 700 is correspondingly provided with a mounting hole 701; and the connection flanging is fit to a surface of the inner side of the bottom plate, and a connector passes through the fixing hole and the mounting hole to fix and connect the sheath to the inner side of the base plate.

Specifically, the connection flanging 301 of the sheath 300 is connected and fixed to the inner side of the bottom plate 700 through screws/bolts. Certainly, fixing connection can be achieved by buckles or welding.

Further, a friction damping device 600 is arranged on the bottom surface of the support portion, making contact with the support surface, of the leveling foot in the embodiment; and preferably, the friction damping device 600 is arranged on the bottom surface of the support base 503. The damping devices 600 may be made of rubber materials such as nitrile rubber, EPDM rubber or polyurethane materials.

The flexible accommodation body in the embodiment may optionally adopt a liquid bag, the liquid bag is provided with a sealing port cooperating with a sealing groove of the hydraulic plate, and the sealing port and the sealing groove are press-fitted by the pressure ring for pressure sealing.

The liquid bag is deformable and may be made of materials such as rubber, silicone or polyurethane.

The liquid bag is completely protected by the sheath, the hydraulic plate and the slider portion, and the deformation quantity is restrained and protected, so that the liquid bag is prevented from being ruptured and damaged, and it is conceivable that the liquid bag may also be additionally provided with a corrugated structure.

The hydraulic medium in the embodiment may be hydraulic oil which has good flow stability.

The leveling foot of the embodiment adopts the hydraulic principle to automatically level the household appliances, which is simple and reliable. Since the slider portions 501 of the regulating foot 500 capable of axially moving relative to the sheaths are arranged in the sheaths 300, adjustment of the household appliance is only limited to the vertical direction, and in order to ensure the stability of leveling, rotation of the regulating foot 500 relative to the sheath 300 needs to be limited. Therefore, multiple limiting sliding grooves are formed in an inner peripheral wall of the sheath 300 according to the embodiment, limiting projections are arranged on the slider portion of the regulating foot 500, and the limiting projections are mounted in the limiting sliding grooves in a vertically sliding mode. Stopper structures 303 are arranged at the bottoms of the limiting sliding grooves 302 for blocking the bottoms of the limiting sliding grooves 302, so that the slider portions of the regulating foot are prevented from falling out of the sheath.

The support leveling device for the household appliance of the embodiment may include two leveling feet communicating with each other, the two leveling feet of the support leveling device for the household appliance of the embodiment are mounted at two corners on one side of the bottom of the household appliance, and two ordinary feet are mounted on the other side of the bottom of the household appliance for support.

Alternatively, the support leveling device for the household appliance in the embodiment may include four leveling feet, every two of the four leveling feet communicate with each other or four leveling feet communicate with one another, and the four leveling feet of the support leveling device for the household appliances in the embodiment are mounted at the four corners of the bottom of the household appliance.

The embodiment provides the leveling foot with simple design structure, small size, convenient production and high reliability, which can effectively realize the leveling of household appliances.

Embodiment 2

The embodiment provides a household appliance provided with the support leveling device for the household appliance according to the above embodiment, the household appliance includes a shell, wherein multiple leveling feet are mounted at a bottom of the shell, and the hydraulic medium filling the leveling feet can circulate between the leveling feet for leveling.

Preferably, at least two leveling feet communicate with each other through a hydraulic pipe, so that the hydraulic medium can circulate between the leveling feet.

A washing machine is taken as an example in the embodiment of the present disclosure for explaining the automatic leveling principle and method of the washing machine through the leveling feet. After the washing machine is mounted, the levels of different leveling feet are different due to unevenness of the ground, and the leveling feet located in the ground pits are low. It can be known that the leveling feet at a high position firstly bear the weight of the washing machine and bear greater gravity of the washing machine, and the leveling feet at a low position bear smaller gravity of the washing machine due to non-contact.

The regulating foot of the leveling foot at the high position move upwards under a large pressure, a height of the whole leveling foot becomes smaller, thus a volume of hollow cavity of the flexible accommodation body filled with the hydraulic medium is reduced, the hydraulic medium are forced to enter a throttling hole or valve hole and to enter the leveling foot located at the low position through a high-pressure pipe, so that the hydraulic medium in the flexible accommodation body of the leveling foot located at the low position is increased, so that the flexible accommodation body expand and push the regulating foot to extend.

When the hydraulic pressures of the leveling foot located at the high position and the leveling foot at the low position are the same, the hydraulic medium do not flow through the high-pressure pipe, the relative position of the regulating foot and the bottom plate of the washing machine does not change, and the washing machine is automatically adjusted.

During a washing or spin-drying process of the washing machine, since the hydraulic medium can also flow slowly for automatic leveling and the vibration noise of the washing machine is greatly lowered.

The hydraulic medium in the embodiment may be hydraulic oil, and are good in fluidity and stable in composition.

In addition, the leveling foot of the above embodiment of the present disclosure can also be applied to household appliances such as refrigerators, freezers and air-conditioning indoor units and the like besides washing machine.

The above embodiments are only the preferred embodiments of the present disclosure, and are not intended to limit the present disclosure in any form. Although the present disclosure has been disclosed as above with the preferred embodiments, the present disclosure is not intended to be limited. Any person skilled in the patent can make use of the above-mentioned technical content to make some changes or modifications to obtain equivalent embodiments without departing from the scope of the technical solutions of the present disclosure, any simple modifications, equivalent changes and modifications made to the above embodiments according to the technical essence of the present disclosure still fall within the scope of the solutions of the present disclosure.

The invention claimed is:

1. A household appliance, comprising:
a shell; and
two support leveling devices, each of the support leveling devices includes a leveling foot being mounted on a bottom plate of the shell, wherein each leveling foot comprises:
a sheath, internally provided with a hollow cavity with an opening, and the opening is mounted on the bottom plate;
a regulating foot, a first end of the regulating foot passing through a through hole arranged on the bottom plate corresponding to the opening of the hollow cavity and extending into the hollow cavity of the sheath, the regulating foot is axially movable relative to the hollow cavity of the sheath, and a second end of the regulating foot being located at an outer side of the bottom plate and supported on a support surface;
a flexible accommodation body with an open portion, arranged in the cavity defined by the regulating foot and the sheath and being in contact with the first end of the regulating foot; the flexible accommodation body being provided with an accommodation cavity for accommodating a hydraulic medium;
a hydraulic plate, arranged in the hollow cavity of the sheath, and internally provided with a throttling flow channel,
a hydraulic nozzle, arranged on the hydraulic plate and communicated with the throttling flow channel,
the open portion of the flexible accommodation body being mounted on the hydraulic plate in a sealed manner and being communicated with the throttling flow channel, and
each hydraulic nozzle of the two support leveling devices communicate with each other via a hydraulic pipe for allowing the hydraulic medium to flow between the two support leveling devices.

2. The household appliance according to claim 1, wherein a side wall of the sheath is provided with an avoiding port penetrating from the opening of the sheath to a closed end of the sheath, the avoiding port is configured to avoid the hydraulic nozzle when the hydraulic plate is mounted in the hollow cavity of the sheath, and
the hydraulic nozzle of the hydraulic plate protrudes out of the sheath through the avoiding port.

3. The household appliance according to claim 1, wherein the regulating foot comprises a slider portion and a support portion,
the slider portion is arranged in the hollow cavity of the sheath and is axially slidable,
one end of the support portion passes through the through hole and extends into the hollow cavity of the sheath and is fixedly connected with the slider portion, and
another end of the support portion extends to the outer side of the bottom plate and is supported on the support surface.

4. The household appliance according to claim 3, wherein the support portion comprises a connecting rod and a support base,
one end of the connecting rod passes through the through hole and extends into the hollow cavity of the sheath and is fixedly connected with the slider portion,
another end of the connecting rod extends to the outer side of the bottom plate and is fixedly connected with the support base, and the support base is supported on the support surface.

5. The household appliance according to claim 3, wherein a friction damping device is arranged on a bottom surface, which is contact with the support surface, of the support portion.

6. The household appliance according to claim 1, wherein the sheath is arranged on an inner side of the bottom plate, and the opening is fixedly mounted on the inner side of the bottom plate.

7. The household appliance according to claim 4, wherein a friction damping device is arranged on a bottom surface of the support base.

8. The household appliance according to claim 6, wherein the opening of the hollow cavity of the sheath is turned outward to form a connection flanging, and a fixing hole is arranged on the connection flanging, and a mounting hole is correspondingly arranged on the bottom plate; the connection flanging is fit to a surface of the inner side of the bottom plate, and     a connector passes through the fixing hole and the mounting hole to fix and connect the sheath to the inner side of the base plate.

9. A household appliance, comprising:

a shell; and two support leveling devices, each of the support leveling devices includes a leveling foot being mounted on a bottom plate of the shell, wherein each leveling foot comprises:

a sheath, internally provided with a hollow cavity with an opening, and the opening is mounted on the bottom plate, a closed end of the hollow cavity of the sheath is internally provided with a throttling flow channel, the closed end of the hollow cavity is provided with a hydraulic nozzle communicating with the throttling flow channel;

a regulating foot, a first end of the regulating foot passing through a through hole arranged on the bottom plate corresponding to the opening of the hollow cavity and extending into the hollow cavity of the sheath, the regulating foot is axially movable relative to the hollow cavity of the sheath, and a second end of the regulating foot being located at an outer side of the bottom plate and supported on a support surface;

a flexible accommodation body with an open portion, arranged in the cavity defined by the regulating foot and the sheath and being in contact with the first end of the regulating foot; the flexible accommodation body being provided with an accommodation cavity, the flexible accommodation body is provided communicating with the accommodation for accommodating a hydraulic medium;

the open portion of the flexible accommodation body is mounted on an inner wall of the closed end of the hollow cavity of the sheath in a sealed manner and is communicated with the throttling flow channel, and a hydraulic nozzle, each hydraulic nozzle of the two support leveling devices communicate with each other via a hydraulic pipe for allowing the hydraulic medium to flow between the two support leveling devices.

\* \* \* \* \*